United States Patent [19]

Padel

[11] Patent Number: 4,967,446
[45] Date of Patent: Nov. 6, 1990

[54] SHRIMP DEVEINING DEVICE

[76] Inventor: Marie O. Padel, 1510 Chantilly, Houma, La. 70360

[21] Appl. No.: 311,339

[22] Filed: Feb. 16, 1989

[51] Int. Cl.⁵ ............................................. A22C 29/00
[52] U.S. Cl. .................................... 452/3; 294/99.2; 452/6
[58] Field of Search .................... 17/72; 294/99.2; 128/354

[56] References Cited

U.S. PATENT DOCUMENTS

| | | | |
|---|---|---|---|
| 411,797 | 10/1889 | Farrell | 30/142 |
| 1,380,232 | 5/1921 | Metcalf | 294/99.2 |
| 2,541,781 | 3/1946 | Riha | 17/72 |
| 2,552,450 | 6/1949 | Paoli | 17/72 |
| 2,594,205 | 9/1950 | Paoli | 17/45 |
| 2,648,094 | 1/1951 | Paoli | 17/72 |
| 2,832,987 | 5/1958 | DiCamillo | 17/72 |
| 3,126,576 | 3/1964 | Johannesen | 17/72 |
| 3,271,814 | 9/1966 | Gorton, Jr. | 17/72 |
| 3,353,207 | 11/1967 | Weinberger | 17/72 |
| 3,420,563 | 1/1969 | Witt | 294/99.2 |
| 4,103,395 | 8/1978 | Latorella | 17/71 |
| 4,200,961 | 5/1980 | Mueller | 17/73 |
| 4,271,563 | 6/1981 | Theuman | 17/71 |
| 4,519,136 | 5/1985 | Walker | 30/142 |
| 4,521,964 | 6/1985 | Maruyama | 39/148 |
| 4,553,287 | 11/1985 | DeSordi et al. | 17/48 |
| 4,634,165 | 1/1987 | Russell et al. | 294/99.2 |
| 4,761,028 | 8/1988 | Dulebohn | 294/99.2 |

FOREIGN PATENT DOCUMENTS 1391867  4/1988  U.S.S.R. ............... 294/99.2

*Primary Examiner*—Willis Little
*Attorney, Agent, or Firm*—C. Emmett Pugh

[57] ABSTRACT

A hand manipulable device for removing the intestine or "vein" from the tail of crustaceans such as shrimp or the like. The device includes means to pierce the body or "tail" of the shrimp, blocking means to prevent over-penetration, pressing means, gripping means for gripping the vein of the shrimp, and handle means for gripping the device. The exemplary embodiment of the present invention is in the general form a pincer for gripping and lifting the vein from the shrimp tail. A new and unique method of deveining crustaceans utilizes a heretofore undisclosed pulling action, as compared to the pushing action disclosed in the prior art. The present invention teaches a superior device and method which work with any size shrimp, will not mutilate the shrimp, can be used with shelled or unshelled shrimp, and remove the whole vein in a consistent manner from uncooked shrimp with ease.

4 Claims, 2 Drawing Sheets

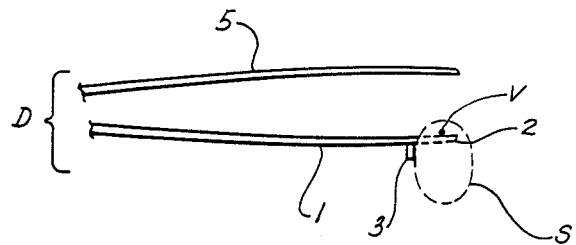
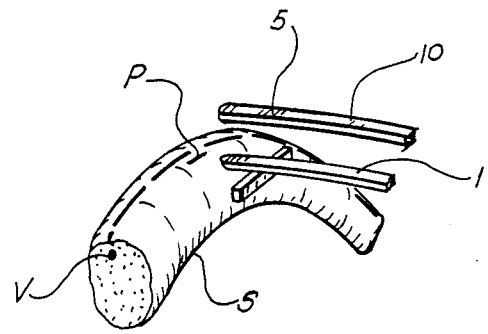
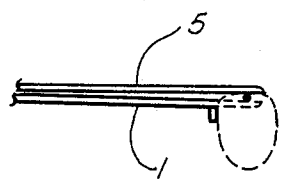
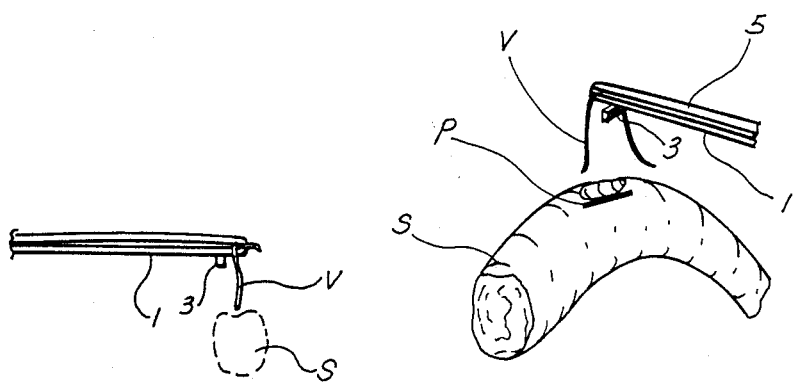

SHRIMP DEVEINING DEVICE

BACKGROUND OF INVENTION

1. Field of Invention

The present invention relates to a hand manipulable crustacean cleaning device, and more particularly to a unique and useful device for easily and effectively removing the intestine or "sand vein" from uncooked shrimp or the like, whether the crustacean is shelled or unshelled.

The present invention removes the intestine from the shrimp in such a manner as to preserve the integrity of the body of the crustacean, thereby retaining its original appearance, with little external evidence of penetration or vein removal. The present apparatus and method satisfactorily prepares shrimp of all sizes utilizing a single device, thereby dispensing with the necessity of different size tools for different size shrimp.

The device of the present invention comprises a manually operated tool having means to penetrate the shrimp to a predetermined depth, stop means to prevent overpenetration, and pressing means associated with the penetration means for removing the vein from the shrimp body.

The present invention further comprises a new and unique method of removing the intestine or "sand vein" from a crustacean or the like. The method comprises a plurality of steps for use in conjunction with the device of the present invention.

2. Prior Art & General Background

The shrimp or "prawn" has long been a seafood delicacy throughout the world, providing a delicious and nutritional food product. The shrimp may be cooked in a variety of fashions, however, the preparation for eating the shrimp is generally the same; that is, the shrimp head and shell must be removed prior to eating. Generally, the shrimp may be cooked without the necessity of removing the head or shell; for example, boiled shrimp are generally prepared whole and are peeled after cooking.

However, the intestinal tract of the shrimp, which includes waste products and intestinal organ tissue, should always be removed prior to cooking, as its contents may effect the taste and consistency of the prepared shrimp, as well as posing a possible health hazard.

The intestinal tract, or "vein", generally has a diameter of approximately one to two millimeters and runs in a parallel fashion from the head of the shrimp, along the upper length of the abdominal musculature or "tail", to the base of the tail fan. Although generally visible through the shell, the vein is normally situated approximately one to two centimeters under the surface of the muscular tissue associated with the tail of the shrimp.

Heretofore, the prior art has failed to teach a desirable method or apparatus to remove the vein from uncooked shrimp in an effective and consistent manner without mutilating or otherwise damaging the shrimp.

A list of prior patents teaching method and apparatus for the removal of the vein from shrimp and the like is included below as follows:

| Patent No. | Patentee(s) | Issue Date |
|---|---|---|
| 411,797 | A. P. Farrell | Oct. 1, 1889 |
| 2,541,781 | C. M. Riha | Feb. 13, 1951 |
| 2,594,205 | S. A. Paoli | April 22, 1952 |
| 2,552,450 | S. A. Paoli | May 8, 1951 |
| 2,648,094 | S. A. Paoli | Aug. 11, 1953 |
| 2,832,987 | A. Di Camillo | May 6, 1958 |
| 3,271,814 | T. S. Gorton, Jr. | Sept. 13, 1966 |
| 3,126,576 | B. Johannesen | March 31, 1964 |
| 3,353,207 | H. Weinberger | Nov. 21, 1967 |
| 4,103,395 | Latorella | Aug. 1, 1978 |
| 4,200,961 | Mueller | May 6, 1980 |
| 4,271,563 | Theuman | June 9, 1981 |
| 4,519,136 | Walker | May 28, 1985 |
| 4,521,964 | Maruyama | June 11, 1985 |
| 4,553,287 | DeSordi et al. | Nov. 19, 1985 |

As may be ascertained by a review of the above patents, the prior art has yet to teach a satisfactory apparatus or method for the removal of the vein of an uncooked shrimp.

The Paoli patents, as well as Camillo, Gorton, and DeSordi all teach elongated, somewhat cylindrically configured tools each having a narrowing circumference ending in a point at one end, with a handle opposite. In usage, the pointed side of the tool would be placed at a designated position and angle relative to the shrimp body between the shell and the tail, and pushed so as to force the shell from the tail in a wedging/pushing action.

While most of the above cited patents primarily teach shell removing apparatus and method for shrimp, some also teach means for removing the vein, either in conjunction with shell removal U.S. Pat. No. (3,271,814 et seq), or as a sole feature U.S. Pat. No. (2,541,781). The vein removing means in these patents either comprises the implementation of protrusions on the surface of the tool or a somewhat pointed tip. The protrusions or pointed tips are configured in such a manner as to penetrate the outer tissue area above the vein, then engage the vein and push it out of the tail while removing the shell simultaneously.

The above method for removing the vein from shrimp is on the whole ineffective and undesirable for a variety of reasons. Most of the problems associated with this method relate to the pushing action required to push the shell and vein from the tail, as will be further clarified below.

The vein of the shrimp comprises an intestinal member generally containing food and waste product from the digestive system of the shrimp. As the vein is a container of sorts, it is beneficial to remove it as a whole, and not in parts.

The pushing action taught in the above method tends to mutilate the vein, as the protrusion or tip for penetrating the tissue area to reach the vein also tends to penetrate and cut the vein itself. In addition, the pushing action associated with the operation of the tool also tends to rupture the vein, as it tends to "bunch up" the vein as it is pushed the length of the tail.

Another problem associated with the above method is that it also tends to multilate the shrimp tail itself, due to the incising action associated with penetrating the tissue to reach the vein; the damage is made even greater due to the pushing action, which tends to "rip" the tissue rather than cut it.

Still another problem associated with the above method and apparatus is that it only works with shrimp of a limited size region. Use of the tool with a small shrimp would result in mutilation, as the protrusion or tip would cut too deeply, while use with a large shrimp would be ineffective, as the protrusion would not incise the tissue to a sufficient depth to reach the vein.

After reviewing the above prior art, it should become apparent that there exists a need for a new method and apparatus for the manual removal of the vein of a shrimp. The new method and apparatus should remove the vein intact from shrimp of all sizes, be easy to use, and not mutilate the shrimp in the process.

3. General, Summary Discussion of the Invention

The present invention in its preferred embodiment comprises a hand manipulable tool of metal, plastic or the like configured to penetrate the upper tail area of the shrimp including means to stop penetration at a desired depth, clamping means to retain the vein, and handle means to allow the vein to be pulled from the shrimp in a perpendicular fashion relative to the tail.

The preferred embodiment of the present invention teaches an elongated pincer comprising two flat, somewhat rectilinear, planer surfaces joined at one end and configured to be separated in a spaced, parallel, opposed fashion at the other end.

At first glance, the preferred embodiment may resemble a typical pair of tweezers, such as those used for removing facial hairs and the like. However, the present invention has features which significantly distinguish it from the household tweezers. The lower member of the present invention is honed to a pointed tip to allow for easy penetration of the tissue of the tail of the shrimp, as opposed to the laterally extended, flat edge of the typical tweezers. Additionally, at a predesignated distance from the tip, the present invention further includes a blocking member perpendicular to the lower member; this blocking member prevents overpenetration of the shrimp tissue for vein removal.

While pointed, the lower member nonetheless also is flat and includes a gripping surface on its inner side for gripping the vein. The upper pincer member is not pointed, as it does not penetrate the tissue of the tail. The upper member preferably does contain a gripping surface on its underside, near the end opposite that joined to the lower member.

The present invention further includes handle means in the form of a tubular member of latex or the like configured to envelop approximately half of the instrument, the enveloping member covering the pincer from the side where the upper and lower members are joined, to approximately one half the length of the instrument.

The cover provides a sanitary, secure handle area for the device; further, the flexible nature of the cover allows the instrument to be squeezed closed for retaining the shrimp, or held in an open position while placing the instrument in the appropriate position relative to the shrimp for vein removal.

The present invention also includes a new and unique method for the removal of the vein of shrimp and the like. The method includes the perpendicular penetration of the upper tail area of the shrimp with the lower member of the instrument to the point where the stopping member stops penetration, the squeezing of the upper and lower member together to grip the vein, and the pulling of the tool perpendicular from the tail to remove the vein.

The present invention is obviously distinguishable from the prior art, which relied upon a parallel pushing action for vein removal, thereby causing unsatisfactory results.

It is therefore an object of the present invention to provide a hand manipulable vein removal tool for shrimp and the like which is easy to use, inexpensive to manufacture, and effective in its use.

It is a further object of the present invention to provide a hand manipulable vein removal device for shrimp and the like which may be used on shrimp of varying sizes.

It is still a further object of the present invention to provide a hand manipulable vein removal device for shrimp and the like which leaves the tail of the shrimp intact and does not mutilate the tissue of the tail.

It is still another object of the present invention to provide a hand manipulable vein removal device for shrimp and the like which removes the vein without the necessity of shelling the shrimp.

It is still another object of the present invention to provide an improved method of removing the vein from shrimp and the like utilizing a pulling action, rather than the pushing action disclosed in the prior art.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIGS. 4A-4C are side, partially cutaway views illustrating the multi step preferred process of removing the vein of a shrimp or the like from the tail of a shrimp or the like, showing the device of the present invention piercing the upper sidewall of the shrimp tail, penetrating the tail to a predetermined depth, clamping the tail with the pincer members and lifting the vein from the tail.

FIGS. 5A-5B illustrate the process as described in FIGS. 4A-4C at a side, perspective angle.

DETAILED DESCRIPTION OF THE PREFERRED, EXEMPLARY EMBODIMENT(S)

Figure 1:
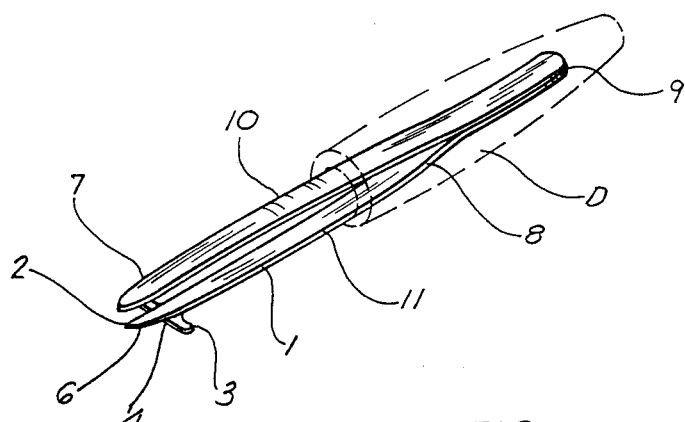
FIG. 1 is a side, perspective view of the preferred embodiment of the present invention showing the handle portion of the instrument under the cover in phantom line.
Figure 2:
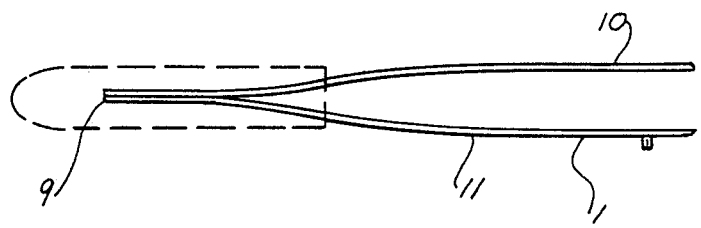
FIG. 2 is a side view of the preferred embodiment of the present invention illustrating the piercing member, and showing in phantom line that portion of the piercing member under the cover.
Figure 3:
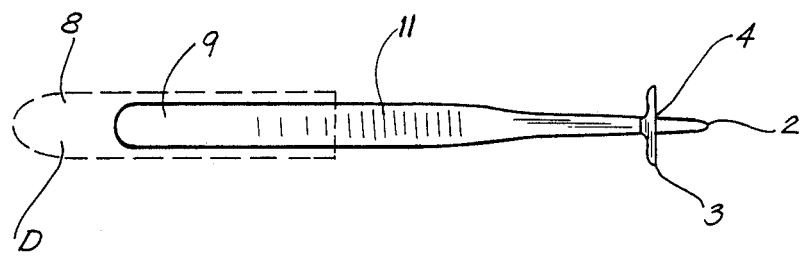
FIG. 3 is a bottom view of the preferred embodiment of the present invention illustrating the piercing member, and showing in phantom line that portion of the piercing member under the cover.

As illustrated in FIGS. 1, 2 & 3, the preferred embodiment of the deveiner D of the present invention includes piercing member 1 and retaining member 5, mounted in such a manner as to be configured substantially or generally parallel to one another. Piercing member 1 and retaining member 5 are weldingly affixed or otherwise fused to one another at area 9. The instrument may also be molded in one piece, thereby dispensing with the necessity of joining the two members together.

Piercing member 1 includes a pointed tip 2 for penetrating the shell and tissue of the shrimp tail and a laterally extended, stopping or blocking member 3 for preventing the piercing member from penetrating too deep down into the tail. Blocking member 3 is positioned back at a predesignated distance 4 according to how deep the user wishes to penetrate the shrimp tail. An exemplary depth would be about one to two mm.

On the interior side of piercing member 1 facing the retaining member 5, gripping indentations or serrations 6 are provided, as are gripping indentations or serrations 7 on the same opposed area of the retaining member 5. These indentations 6, 7, on the distal end portions of the pressing members 1, 5, face one another and are provided for gripping between them the vein of the shrimp during removal.

Enveloping the proximal end portion of the device D, where the piercing and retaining members 1, 5 are joined, is cover 8. Cover 8 may be constructed of latex, plastic, or the like, and comprises a somewhat tubular member joined at the end behind the portion where members 1, 5 are fused. Cover 8 is configured to fit tightly over the device D so as to provide a satisfactory gripping surface while utilizing device D.

Included on the outer sides of piercing and retaining members 1, 5 are gripping surfaces 10, 11 providing a steady grip on the instrument for the thumb and forefinger during implementation.

As illustrated in FIGS. 4A–5B, device D is gripped between the thumb and forefinger such that the thumb rests upon gripping surface 11 and the forefinger rests upon gripping surface 10. Holding the shrimp body S (whether shelled or unshelled), such that vein V is, for example, somewhat horizontal to the ground with the other hand, the piercing member 1 is placed such that piercing point 2 is against the side of the side of the shrimp tail just below the vein area at approximately half the length of the tail, illustrated as area P in FIG. 5A.

With the retaining member 5 above the piercing member 1, the piercing point 2 is inserted into the body of the shrimp and pressed into it, making an opening through the shell (if the shell is still on) until the blocking member 3 touches the shrimp body S. The piercing and retaining members 1, 5 are then pressed together in a pincher action until the tips thereof would touch, and the device D is lifted from the tail, allowing the gripping surface 6, 7 to grip the vein and be pulled from the shrimp. The process is then repeated on any remaining shrimp.

Exemplary dimensions of the device or deveiner D are outlined below:

Lengths of piercing and retaining pincers 1, 5, (from end to end): 4 inches
"Vertical" separation distance between tip point 2 and opposed end of retainer pincer 5: ½ inch
Width of stop/block member 3: ¼ inch
Set-back distance of stop/block member 3 (distance 4): ⅛ inch It is noted that the present process does not mutilate the shrimp and results in a clean deveining of the shrimp with little effort and time.

The embodiment(s) described herein in detail for exemplary purposes are of course subject to many different variations in structure, design, application and methodology. Because many varying and different embodiments may be made within the scope of the inventive concept(s) herein taught, and because many modifications may be made in the embodiment(s) herein detailed in accordance with the descriptive requirements of the law, it is to be understood that the details herein are to be interpreted as illustrative and not in a limiting sense.

What is claimed is:

1. A hand manipulable device for removing the intestine or "vein" from crustaceans having side bodies such as shrimp and the like, said device comprising:
    opposed pressing means, said opposed pressing means further comprising an upper and lower pressing member configured in such a manner as to allow one side of said pressing members to contact the other;
    blunt tip means associated with said upper pressing member;
    penetration means associated with said lower pressing member of said opposed pressing means for penetrating the tail of the crustacean, said penetration means further comprising a pointed tip at the end of said lower pressing means;
    stop means associated with said penetration means to prevent overpenetration, said stop means further comprising a laterally elongated member affixed to said lower pressing means in a lateral fashion at a distance back from said piercing means corresponding to the location of said vein relative to the side; and
    gripping means associated with said pressing means.

2. The device of claim 1, wherein said gripping means comprises a plurality of small indentations on the surface of said pressing members where said pressing members contact when in their closed or pressing disposition.

3. The device of claim 1, wherein there is further included handle means, said handle means comprising a cover of latex, plastic or the like covering said pressing means at the area in which said upper and lower pressing means is joined, said covering approximately one half of the length of said pressing means.

4. The method of removing the intestine or "vein" from the body or "tail" of crustaceans such as shrimp and the like, said method comprising the following step(s):
    a. utilizing a hand manipulable device for deveining shrimp and the like, said device comprising:
        penetration means for pentrating the body of the crustacean,
        stop means associated with said penetration means to prevent overpenetration,
        pressing means associated with said penetration means, and
        gripping means associated with said pressing means;
    b. gripping said device between the thumb and forefinger such that the thumb and forefinger rests on said gripping means;
    c. holding the shrimp body and piercing the top wall of said shrimp body just under said vein, about mid-length of said shrimp body with said piercing means of said device;
    d. continue pushing said piercing means into said shrimp until said stop means contacts the top of said shrimp;
    e. pressing said pressing means until said pressing members would contact one another at their distal end portions grabbing said vein; and
    g. lifting said device from said body with the vein between the distal end portions of said pressing means removing said vein from the said shrimp body.

* * * * *